United States Patent [19]

Saka et al.

[11] Patent Number: 5,049,183

[45] Date of Patent: Sep. 17, 1991

[54] SINTERED MACHINE PART AND METHOD

[75] Inventors: Tsutomu Saka; Akira Fujiwara, both of Saitama; Tadayuki Tsutsui, Chiba; Osamu Murai, Chiba; Kei Ishii, Chiba, all of Japan

[73] Assignees: Hitachi Powdered Metals Co., Ltd., Chiba; Honda Giken Kogyo Kabushiki Kaisha, Tokyo, both of Japan

[21] Appl. No.: 589,413

[22] Filed: Sep. 28, 1990

[30] Foreign Application Priority Data

Oct. 3, 1989 [JP] Japan .................................. 1-257061

[51] Int. Cl.$^5$ .............................................. C22C 29/14
[52] U.S. Cl. ........................................ 75/244; 75/246; 419/11; 419/23; 419/32; 419/38; 419/54; 419/55
[58] Field of Search ................... 75/244, 246; 419/11, 419/23, 32, 38, 54, 55

[56] References Cited

U.S. PATENT DOCUMENTS 3,652,905  3/1972  Derrick ............................... 357/15
4,985,309  1/1991  Ogura et al. ........................ 428/570

Primary Examiner—Stephen J. Lechert, Jr.
Attorney, Agent, or Firm—Sandler, Greenblum & Bernstein

[57] ABSTRACT

A method of manufacturing a sintered machine part, by which the machine part can be manufactured to be sufficiently strong, wear and abrasion resistive, and durable against the fatigue caused by recursive impacts, without the heat treatments. In the method, a machine part composed of 0.1 to 0.8% of carbon by weight, 2 to 6% of nickel by weight, 0.6 to 1.6% of molybdenum by weight, 1 to 3% of copper by weight and balance iron is manufactured by mixing partially diffused alloy powder composed of 2 to 6% of nickel by weight, 0.4 to 0.6% of molybdenum by weight, 1 to 3% of copper by weight and balance iron with graphite powder amounting to 0.1 to 0.8% by weight and molybdenum simple powder having 2 to 7 μm mean particle size amounting to 0.2 to 1% by weight, and then by compacting the mixed powder and sintering the compact.

14 Claims, 4 Drawing Sheets

Mo CONTENT IN SINTERED ALLOY (% BY WEIGHT)

ADDITIVE AMOUNT OF Mo SIMPLE POWDER
(% BY WEIGHT)

MEAN PARTICLE SIZE OF ADDITIVE Mo SIMPLE POWDER ($\mu$m)

SINTERED MACHINE PART AND METHOD

BACKGROUND OF THE INVENTION

1. Field of the Invention

The present invention relates to a method of manufacturing a sintered machine part using a powder metallurgical method, and more particularly, to a method of manufacturing a machine part such as a synchronizer hub for a motorcar which requires a highly accurate size.

2. Description of the Prior Art

A transmission part for a motorcar such as a synchronizer hub operates under a bending force and a tensile force due to its sliding motion with respect to driving shafts, a sleeve and a ring of a synchronizer. For this reason, it is required to have a sufficient durability against recursive impacts such as those associated with gear shifting operations.

Such a synchronizer hub has been manufactured by method of powder metallurgy since more than twenty years ago, but a motorcar of those days had a relatively small engine power so that each machine part of the engine were loaded only lightly. For this reason, an ordinary sintered steel composed of iron, copper and carbon has been satisfactory as a material for the synchronizer hub.

However, as a result of recent regulation on the exhaust gas, and new technological developments after the oil shock crisis, especially those related to a high-power and high performance engine, the materials used for the synchronizer hub in the past had become insufficient. For this reason, the material for the synchronizer hub has been changed to a high alloy sintered steel having additive ingredients such as chromium and nickel, whose strength and wear and abrasion resistance are further improved by various heat treatments such as carburizing and induction hardening.

Yet, more recent trend requires such a high grade motorcar which is excellent not only in terms of the engine performance, but also in terms of comfortableness such as a smallness of noises and vibrations transmitted to a driver's seat during the running and a smoothness of the gear shifting operation.

Now, there are many factors related to the realization of such a high grade motorcar. As for the transmission parts, each part is required to be smoothly finished, without distortion, and capable of making a tight engagement with a partner part while being smoothly slidable each other. These in turn necessitate far more stringent precision for the sizes of the parts and accurate manufacturing of such parts, in a case of the synchronizer hub.

Here, the problem arises in relation to the heat treatments after the sintering. Namely, the conventional sintered alloy cannot achieves satisfactory mechanical properties without the heat treatments, while on the other hand, the heat treatments cause the distortion on the manufactured parts, so that it has been difficult to preserve the precision of the sizes of the parts.

SUMMARY OF THE INVENTION

It is, therefore, an object of the present invention is to provide a method of manufacturing a sintered machine part, by which the machine part can be manufactured to be sufficiently strong, wear and abrasion resistive, and durable against the fatigue caused by recursive impacts, without the heat treatments.

In accordance with the present invention, there is provided a method of manufacturing a sintered machine part, the machine part being composed of 0.1 to 0.8% of carbon by weight, 2 to 6% of nickel by weight, 0.6 to 1.6% of molybdenum by weight, 1 to 3% of copper by weight and iron for a rest, the method comprising steps of: (a) mixing partially diffused alloy powder composed of 2 to 6% of nickel by weight, 0.4 to 0.6% of molybdenum by weight, 1 to 3% of copper by weight and balance iron with graphite powder amounting to 0.1 to 0.8% by weight and molybdenum simple powder amounting to 0.2 to 1% by weight; (b) compacting the mixed powder obtained in the step (a) by compression to form a compact for a machine part; and (c) sintering the compact obtained in the step (b).

The method of the present invention is particularly suitable for manufacturing a synchronizer hub of a motorcar, because of an improved precision of a product size achievable by the method of the present invention.

DETAILED DESCRIPTION OF THE PREFERRED EMBODIMENTS

Figure 1A:
FIG. 1A is a metallographic photomicrograph for a sintered alloy obtained by the method of the present invention.

The process of manufacturing the sintered alloy according to the present invention comprises steps of mixing raw material powder, compacting the mixed powder, and sintering the compact, which is characterized in that, at the mixing step, partially diffused alloy powder composed of 2 to 6% of nickel by weight, 0.4 to 0.6% of molybdenum by weight, 1 to 3% of copper by weight and balance iron is mixed with graphite powder amounting to 0.1 to 0.8% by weight, and molybdenum simple powder having 2 to 7 μm of mean particle size and amounting to 0.2 to 1% by weight, so as to manufacture the machine part composed of 0.1 to 0.8% of carbon by weight, 2 to 6% of nickel by weight, 0.6 to 1.6% of molybdenum by weight, 1 to 3% of copper by weight and balance iron.

This method is based on a research by the present inventors, in which it was found that an alloy containing nickel, copper and molybdenum by a proper proportion is promising. In addition, it was also found that the mechanical properties of this alloy depend on a manner of mixing the molybdenum content. In particular, it was found that the best product properties can be obtained by a method including a step of mixing a part of molybdenum as a simple powder with a partially diffused alloy powder containing the rest of molybdenum and the other components, such that this method can be sufficiently effective without the heat treatments.

The partially diffused alloy powder is a composite alloy powder developed first by the Höganäs, in which the diffusion of the additive components is stopped at an intermediate state, such that the alloy with the complete diffusion can be obtained by the sintering after the compacting. There are many types of the partially diffused alloy powder having different compositions.

In manufacturing the partially diffused alloy powder, the molybdenum component is added in a form of molybdenum trioxide, due to the requirement for controlling the partially diffused state. Here, it is to be noted that the excessive amount of the molybdenum trioxide is considered undesirable because of the inconvenience in manufacturing and the inferior properties such as a compressibility of the resulting partially diffused alloy powder. Moreover, the molybdenum content in the partially diffused alloy powder is limited to 0.4 to 0.6% by weight, because the excessive amount causes a production of unreduced portions in the sintering, which deteriorates the mechanical properties of the manufactured product. Since the molybdenum of about 1% by weight is most preferable according to this invention, a part of molybdenum has to be supplied in a form of additive powder, to be added to the partially diffused alloy powder.

In a general case in which the mechanical properties are not required at so high level, the above described process is sufficient. However, in a case where higher level mechanical properties are required, it is more preferable that the process further includes steps of presintering of the compact and repressing of the presintered compact before the step of sintering of the compact. This is because the repressing of the presintered compact can further increase the density of the sintered product, and therefore the mechanical properties of the product can be improved further.

A sintered alloy manufactured by the method according to the present invention has a distinctive feature in its metallographic structure, and the structural feature of the alloy is closely related the mechanical property of the alloy. For this reason, the structural feature and compositions of the sintered alloy manufactured by the method of the present invention will now be described in detail.

Figure 1B:
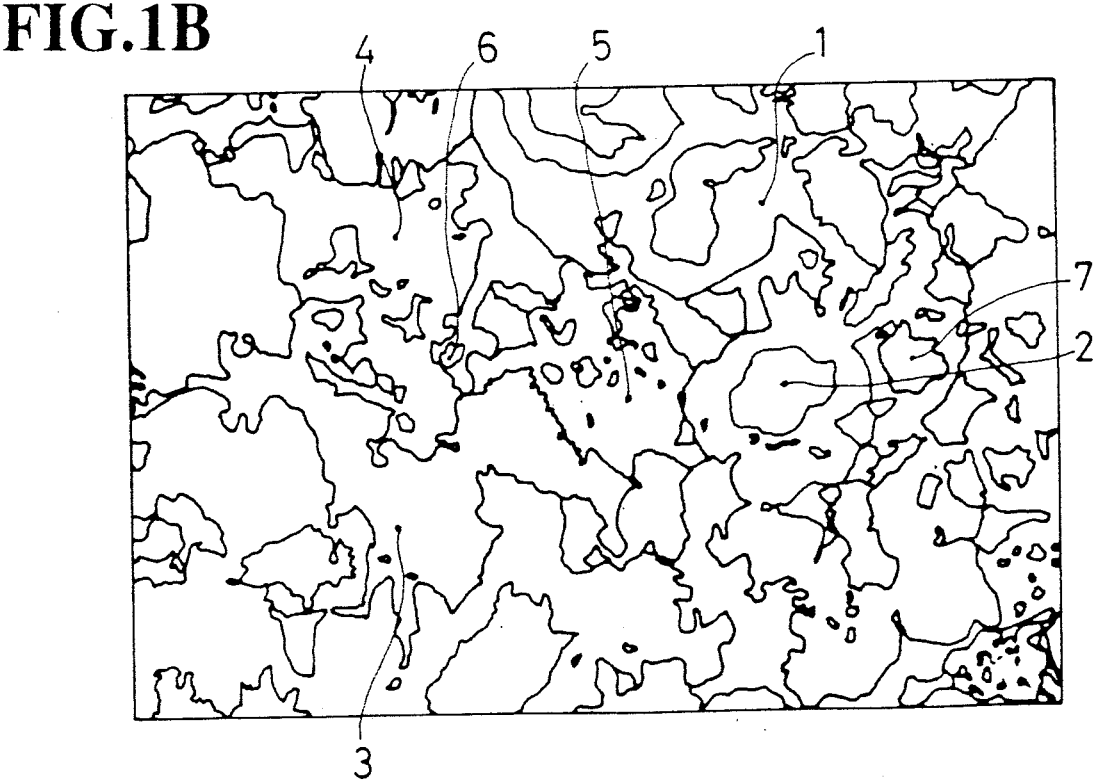
FIG. 1B is an explanatory drawing for the metallographic photomicrograph of FIG. 1A.

FIG. 1A is a photomicrograph showing a metallographic structure of the sintered alloy manufactured by the method of the present invention, and FIG. 1B is an explanatory drawing of the metallographic structure in FIG. 1A, respectively. As shown in FIG. 1B, the sintered alloy of the present invention has various phases coexisting therein, which is rare even for an ingot material but particularly so for a sintered alloy. Phase 1 in the sintered alloy is a ferrite (white-color) phase, and phase 2 is a phase including pearlite and sorbite (banded and lamellar structures). These phases 1 and 2 are soft and such soft phases are considered to be effective in absorbing shocks. Phase 3 of martensite (acicular structure) and phase 4 of bainite (plumous structure) are hard phases. These phases are considered to be effective in increasing the wear and abrasion resistance of the alloy. Phase 5 of nickel-riched austenite (white-colored) is considered to be effective in improving the toughness of the alloy. Thus, as a result of the combined effect of the above-mentioned properties of each phase, the sintered alloy of the present invention has a well-balanced and excellent property on the whole. Phase 6 is a Molybdenum particle (white colored) which has been added simply and has been thereafter remained as it is without being diffused. Phase 7 is a pore characteristic for the sintered alloy. In general, the martensite phase such as that described above can not be produced without a heat treatment of quenching. However, in the present invention, the martensite phase can be produced in the process of furnace cooling after the sintering, because the sintered alloy of the present invention has a high hardenability due to containing nickel, molybdenum and copper components.

Next, the property and compositional constituents of the sintered alloy according to the present invention will be described.

Nickel is contained in the alloy in order to increase the hardenability and further to refine the base structure of the sintered alloy so as to improve its toughness. For giving rise to those effects, more than 2% of nickel by weight is required to be contained in the material. However, when if exceeds 6% by weight, it produces an excessive austenite and thereby deteriorates the strength of the sintered alloy.

Copper is solved in the base material by sintering to enhance the strength of the base, the effect of which becomes significant by the amount of more than 1% by weight. However, the precision for the size of the sintered products falls down as copper increases in amount. Accordingly, the content of copper is limited to be below 3% by weight.

Carbon is added generally in a form of graphite powder, and it drastically improves the hardness and strength of the base at the content of above 0.1% by weight. However, the precipitation of cementite can be caused by the excessive carbon, which embrittles the base of the sintered alloy, so that the carbon content should be limited to be below 8% by weight.

Figure 2:
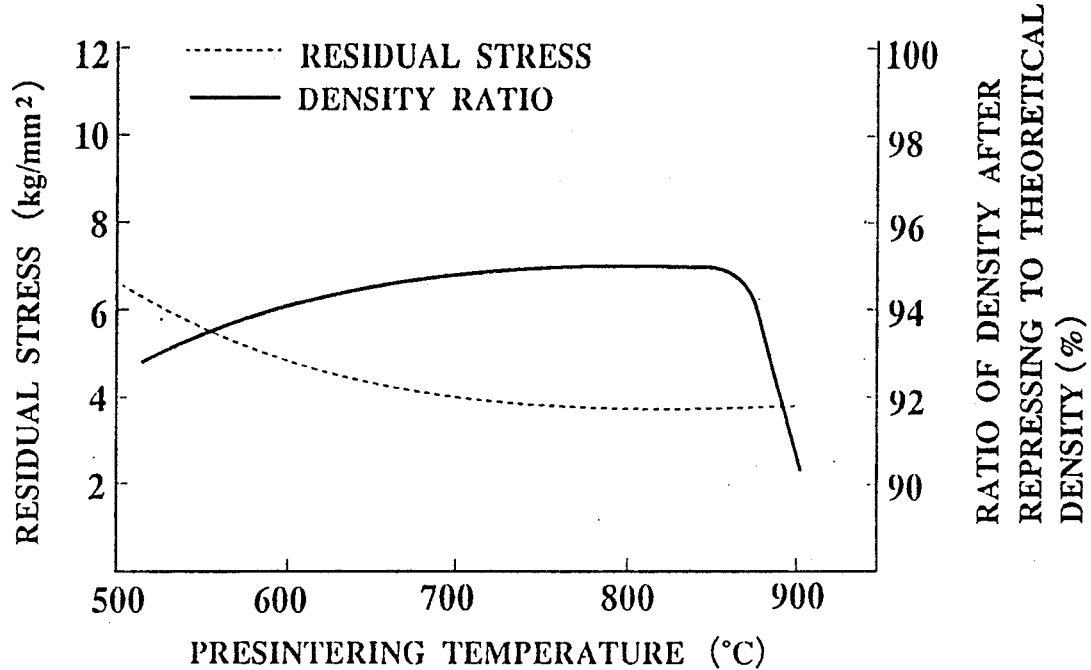
FIG. 2 is a graph showing relationships of a residual stress and a density ratio with respect to a presintering temperature.
Figure 3:
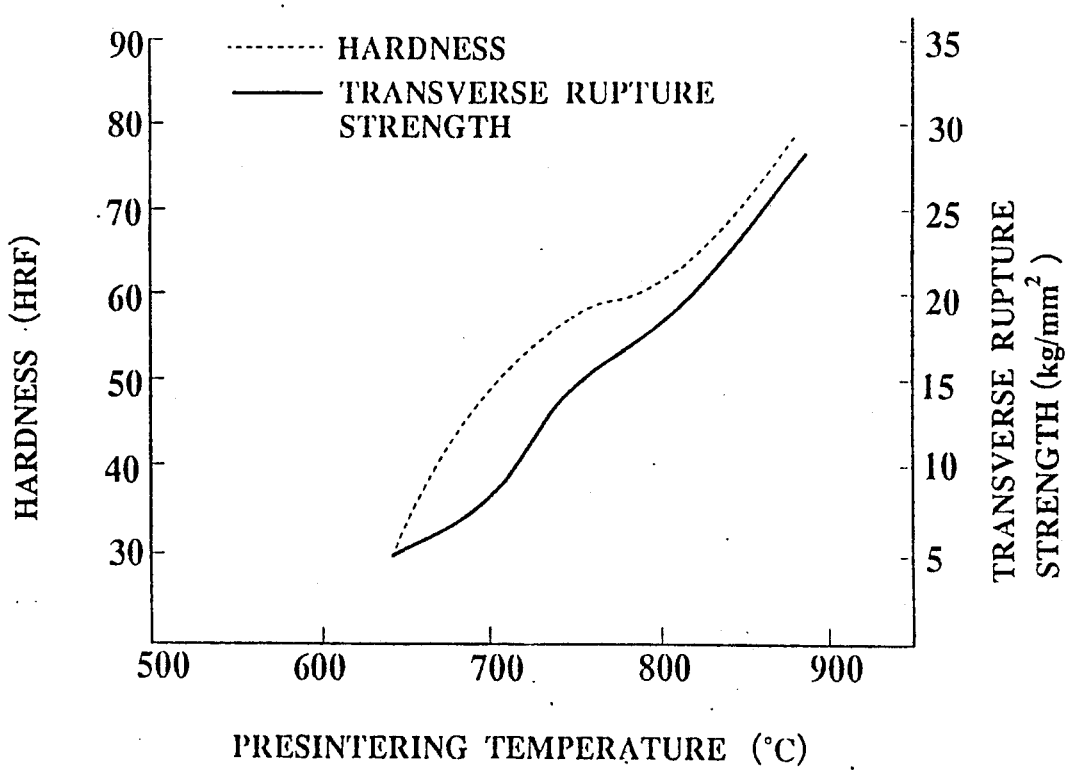
FIG. 3 is a graph showing relationship of a hardness and a transverse rupture strength with respect to a presintering temperature.

FIG. 2 is a graph showing relationships of the residual stress (indicated by dotted line) in the presintered compact and the density (indicated by solid line) of the presintered product after the repressing (indicated as a ratio of the density after the repressing to theoretical density) with respect to the presintering temperature. FIG. 3 is a graph showing relationships of the hardness (indicated by dotted line) and strength (transverse rupture strength, indicated by solid line) of the presintered compact with respect to the presintering temperature. As shown in FIGS. 2 and 3, the compact is not fully subjected to the destressing by the presintering at 650° C. Moreover, by the presintering at over 850° C., carbon is diffused to harden the alloy, so that it becomes difficult to condense the compact by the repressing. It is needless to say that some degree of strength is required for handling the compact to be sintered, but it is empirically found that 15 kg/mm$^2$ of the transverse rupture strength is enough for handling the compact to be sintered even in a case where the compact has a complicated shape such that a cracking can easily be produced when the compact is repressed. Judging from the results as described above, the optimum presintering temperature is between 650° C. and 850° C. where the high mechanical strength and good compactibility are obtained.

Figure 4:
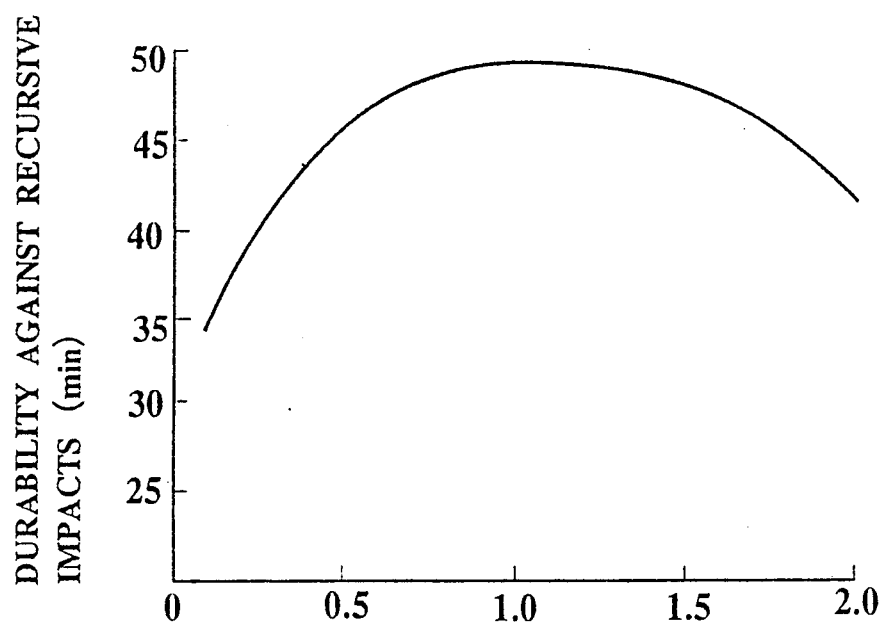
FIG. 4 is a graph showing a relationship of a durability against recursive impacts with respect to a molybdenum content in a sintered alloy.

FIG. 4 shows a relationship between molybdenum content in the sintered alloy and the durability of the sintered alloy against recursive impacts. The durability is measured as a time taken for fracturing the sintered alloy standing under the load, which is loaded downward on the sintered alloy sample at the weight of 5 kg/mm$^2$ and at the interval of 6.5 Hz. Each of the sample for the measurement has the size of 10 mm×10 mm×55 mm and includes a U-shaped notch at the intermediate portion thereof, and two end portions of the sample are supported at the span of 40 mm with the U-shaped notch directed downward. As shown in FIG. 4, the durability of the sintered alloy containing 0.6% to 1.6% of molybdenum by weight is roughly at the same level, and reaches to a maximum value in a vicinity of 1% of molybdenum content. The sintered alloy having less than 0.6% or more than 1.6% of molybdenum looses its durability drastically.

In preparation of the samples for the above described measurements, four kinds of partially diffused alloy powder, each containing 4% of nickel, 2% of copper, 0%, 0.4%, 0.5% or 0.6% of molybdenum by weight and balance iron, respectively, are utilized in accordance with the molybdenum content of each sample. The sample is prepared by mixing one of the above partially diffused alloy powder with graphite powder amounting to 0.6% by weight and supplementary molybdenum simple powder having 5 μm mean particle size. In a case in which the molybdenum is added to the partially diffused alloy powder in a form of molybdenum trioxide, the reduction of the alloy by the sintering does not fully proceed so that the strength of the sintered alloy is lowered. Furthermore, in a case of using ferromolybdenum, a liquid phase is formed in the alloy at the sintering, which produces a cavity. Therefore, it is desirable to use the molybdenum powder of higher purity.

Figure 5:
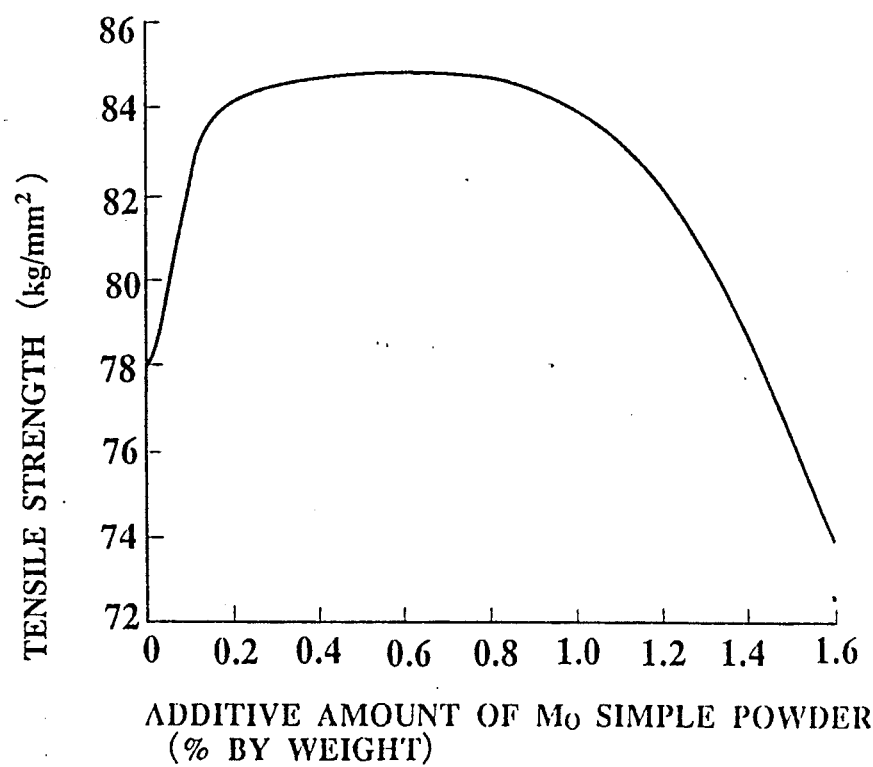
FIG. 5 is a graph showing a relationship of a tensile strength with respect to an additive amount of molybdenum simple powder.

FIG. 5 is a graph showing a relation of the tensile strength of the sintered alloy and the additive amount of the molybdenum simple powder. Samples for the above measurement is prepared by using the molybdenum simple powder having a purity of 99.8% by weight and a mean particle size of 5 μm and the partially diffused alloy powder having a molybdenum content of 0.6% by weight. In detail, the preparation of the sample from additive molybdenum powder of the amount of 0.8% by weight gives a sample containing 1.4% of molybdenum by weight, and that from no additive molybdenum powder gives a sample containing 0.6% of molybdenum by weight. As shown in FIG. 5, the tensile strength increases drastically as the molybdenum simple powder is added, and reaches to a nearly constant level by the addition in the range of 0.2 to 1.0% by weight, but decreases thereafter. Thus, the suitable amount of molybdenum should be at the range of 0.2% to 1% by weight.

Figure 6:
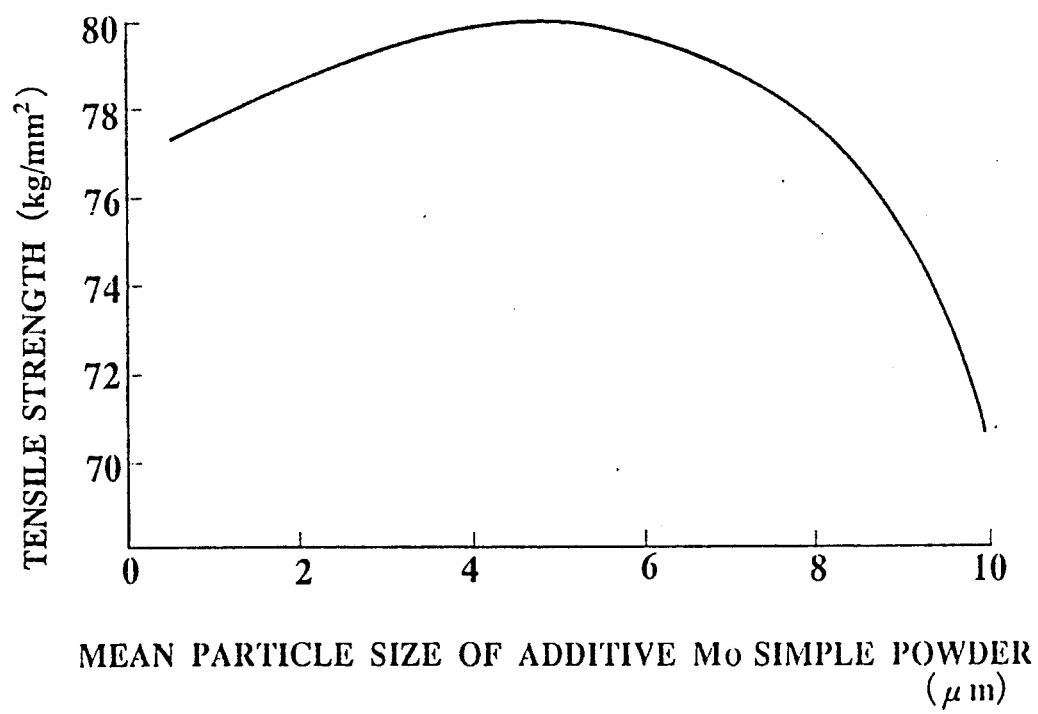
FIG. 6 is a graph showing a relationship of a tensile strength with respect to a mean particle size of molybdenum simple powder.

Moreover, the particle size of the additive molybdenum powder is another important factor which characterizes the sintered alloy. In FIG. 6, there is shown the strength (tensile strength) of the sintered alloy with respect to the mean particle size of additive molybdenum simple powder. A curve for the tensile strength reaches a peak at the range of 4 μm to 5 μm of mean particle size. It should be understood that particles of smaller size are likely to be involved in a secondary solidification among the particles, which results in a production of a segregation in the sintered alloy, whereas particles of larger sizes are difficult to be diffused in the alloy base and furthermore a larger particle itself can be a cause of the notch effect. In view of the above, it is preferable to adopt a mean particle size between 2 μm to 7 μm for the additive molybdenum powder.

It is to be noted that the samples used in the measurements in FIGS. 4 to 6 are prepared by the process including only the steps of mixing, compacting and sintering, without the steps of presintering and repressing. This is because the significance of one of various factors in the production process can be realized more distinctively when the tests are carried out with eliminating the influence of the other factors suppressed as much as possible. Accordingly, though the density of the each sample is lower than that of the sintered alloy by the process including the steps of compacting, presintering, repressing and sintering, the results of measurements in the above tests show the influence of respective factor clearly.

Now, a few examples of the products manufactured by the method of the present invention and some comparative examples will be described.

EXAMPLE I

Partially diffused alloy powder composed of 4% of nickel by weight, 0.5% of molybdenum, 2% of copper and balance iron was mixed with graphite powder amounting to 0.6% by weight, molybdenum simple powder having a purity of 99.8% by weight and 5 μm of a mean particle size at the amount of 0.6% by weight, and zinc stearate as a lubricant amounting to 0.8%. The mixed powder was formed into a compact having a green density of 7.0 g/cm$^3$ with predetermined shape, and presintered under reducing atmosphere at the temperature of 780° C. for 30 min. Then, the compact is repressed under the pressure of 6 t/cm$^2$, and sintered under reducing atmosphere at the temperature of 1,130° C. for 60 min.

EXAMPLE II

The same mixed powder as in the example I was compacted by the same manner, and the compact was sintered under reducing atmosphere at the temperature of 1,130° C. for 60 min.

COMPARATIVE EXAMPLE I

Alloy powder composed of 2% of nickel by weight, 0.5% of molybdenum, 0.7% of manganese and balance iron was mixed with graphite powder amounting to 0.3% by weight and zinc stearate as a lubricant amounting to 0.8%. The mixed powder was formed into a compact having a green density of 7.0 g/cm$^3$ with the predetermined shape, and sintered under reducing atmosphere at the temperature of 1,130° C. for 60 min., and heat treated as carburizing.

COMPARATIVE EXAMPLE II

Alloy powder composed of 1% of chromium by weight, 0.2% of molybdenum, 0.7% of manganese and balance was mixed with graphite powder amounting to 0.3% and zinc stearate as a lubricant amounting to 0.8% by weight. The mixed powder is compacted and subjected to the sintering and heat treated as carburizing in the same manner as in the Comparative Example I.

MEASUREMENTS OF MECHANICAL PROPERTIES

The mechanical properties of each of the products obtained in the above examples were measured, the results of which are shown in Table 1 below.

The products of the comparative examples I and II, although they are satisfactory in the tensile strength and durability against recursive impact, are nevertheless not satisfactory as the material for the synchronizer hub to be used in a high grade car, because their sizes fluctuate too widely as a result of the heat treatments they need to received.

On the contrary, the products manufactured by the method according to the present invention have the same level of the tensile strength and transverse rupture strength in spite of being not subjected to the heat treatments, and they are much more excellent in the durability against recursive impacts. In addition, the size fluctuation which is the most important thing in the synchronizer hub is dramatically improved, as shown in Table 1. Specifically, the size fluctuation in the products of example II, in which no presintering is used, is reduced to only about 60% of the comparative examples I and II using the conventional sintering process, and furthermore, that of the example I, in which the presintering is used, is reduced to only about 40% of the comparative examples I and II.

Consequently, the method of the present invention improves the various mechanical properties and the size fluctuation of the product, such that a machine part manufactured by the method of the present invention has the superior operational stability and durability. It is, therefore, suitable for the manufacturing of a transmission part for a motorcar such as a synchronizer hub.

As many apparently widely different embodiments of this invention may be made without departing from the spirit and scope thereof, it is to be understood that the invention is not limited to the specific embodiments thereof except as defined in the appended claims.

TABLE 1

| | example I | example II | comparative example I | comparative example II |
|---|---|---|---|---|
| sintered density (g/cm³) | 7.38 | 7.02 | 7.04 | 7.00 |
| tensile strength (kg/mm²) | 102.9 | 83.4 | 103.6 | 86.5 |
| durability against recursive impacts (min.) | 70.2 | 39.6 | 20.5 | 14.3 |
| transverse rupture strength (kg/mm²) | 212.5 | 184.4 | 190.7 | 156.4 |
| size fluctuation (%) | 0.13 | 0.18 | 0.30 | 0.32 |
| note | including | including | including | |

TABLE 1-continued

| example I | example II | comparative example I | comparative example II |
|---|---|---|---|
| presintering & repressing | heat treatment | heat treatment | |

What is claimed is:

1. A method of manufacturing a machine part by sintering, the machine part being composed of 0.1 to 0.8% of carbon by weight, 2 to 6% of nickel by weight, 0.6 to 1.6% of molybdenum by weight, 1 to 3% of copper by weight and balance iron, the method comprising steps of:
   (a) mixing partially diffused alloy powder composed of 2 to 6% of nickel by weight, 0.4 to 0.6% of molybdenum by weight, 1 to 3% of copper by weight and balance iron with graphite powder amounting to 0.1 to 0.8% by weight and molybdenum powder having 2 to 7 μm of mean particle size and amounting to 0.2 to 1% by weight;
   (b) compacting the mixed powder obtained in the step (a) by compression to form a compact for a machine part; and
   (c) sintering the compact obtained in the step (b).

2. The method of claim 1, the method further comprising before the step (c) of sintering steps of:
   (1) presintering the compact obtained in the step (b); and
   (2) repressing the presintered compact obtained in the step (1).

3. The method of claim 2, wherein the compact is presintered approximately at the temperature of 650° C. to 850° C. in the step (2).

4. The method of claim 3, wherein the compact is presintered preferably at the temperature of 780° C. in the step (2).

5. The method of claim 4, wherein the compact is sintered approximately at the temperature of 1,130° C.

6. The method of claim 1, wherein the sintered machine part manufactured is a synchronizer hub.

7. The method of claim 2, wherein the sintered machine part manufactured is a synchronizer hub.

8. The machine part manufactured by the method of claim 1.

9. The machine part manufactured by the method of claim 2.

10. The machine part manufactured by the method of claim 3.

11. The machine part manufactured by the method of claim 4.

12. The machine part manufactured by the method of claim 5.

13. A synchronizer hub manufactured by the method of claim 1.

14. A synchronizer hub manufactured by the method of claim 2.

* * * * *